(12) United States Patent
Cho et al.

(10) Patent No.: US 11,803,354 B2
(45) Date of Patent: Oct. 31, 2023

(54) MAC OPERATING DEVICE AND METHOD FOR PROCESSING MACHINE LEARNING ALGORITHM

(71) Applicant: KOREA ADVANCED INSTITUTE OF SCIENCE AND TECHNOLOGY, Daejeon (KR)

(72) Inventors: Seonghwan Cho, Daejeon (KR); Hyuk Jin Lee, Daejeon (KR); Kyung Hyun Kim, Daejeon (KR); Jin-O Seo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 332 days.

(21) Appl. No.: 17/178,592

(22) Filed: Feb. 18, 2021

(65) Prior Publication Data

US 2022/0206756 A1 Jun. 30, 2022

(30) Foreign Application Priority Data

Dec. 31, 2020 (KR) ........................ 10-2020-0189511

(51) Int. Cl.
*G06F 7/544* (2006.01)
*G06G 7/16* (2006.01)

(52) U.S. Cl.
CPC ............. *G06F 7/5443* (2013.01); *G06G 7/16* (2013.01); *G06F 2207/4814* (2013.01)

(58) Field of Classification Search
CPC ...... G06F 7/5443; G06F 7/462; G06F 7/5334; G06F 2207/4824; G06F 2207/4814
USPC .......................................................... 708/523
See application file for complete search history.

(56) References Cited

U.S. PATENT DOCUMENTS 11,204,740 B2 * 12/2021 Cho ........................ G06N 3/063
2018/0253643 A1 9/2018 Buchanan et al.

FOREIGN PATENT DOCUMENTS

KR 1020180101276 9/2018
KR 1020200068560 6/2020

* cited by examiner

*Primary Examiner* — Tan V Mai
(74) *Attorney, Agent, or Firm* — LEX IP MEISTER, PLLC

(57) ABSTRACT

A MAC operating device comprising a plurality of operation circuits respectively including an operation capacitor and a plurality of switches; and a division capacitor, wherein one end of the operation capacitor is respectively connected to a first operation switch connected to an input terminal and a first reset switch connected to a ground terminal, and the other end of the operation capacitor is connected to both a second operation switch connected to a division capacitor and a second reset switch connected to the ground terminal is provided.

13 Claims, 6 Drawing Sheets

MAC OPERATING DEVICE AND METHOD FOR PROCESSING MACHINE LEARNING ALGORITHM

CROSS-REFERENCE TO RELATED APPLICATION

This application claims priority to and the benefit of Korean Patent Application No. 10-2020-0189511 filed in the Korean Intellectual Property Office on Dec. 31, 2020, the entire contents of which are incorporated herein by reference.

BACKGROUND OF THE INVENTION

(a) Field of the Invention

The present disclosure relates to a MAC operating device and method for processing a machine learning algorithm.

(b) Description of the Related Art

A deep learning algorithm has many parameters for operations, and has a structure in which the number of operations for updating the parameters may easily be increased.

A CPU or a GPU is used to process the deep learning algorithm, but it expends a huge amount of electric power to process the deep learning algorithm because of its configuration, so the CPU and the GPU are not efficient in accelerating the deep learning algorithm. Mobile and IoT devices with low electric power consumption process the deep learning algorithm by using a field-programmable gate array (FPGA) or an application-specific integrated circuit (ASIC) so as to overcome a limit of electric power consumption.

However, the operation model based on a digital circuit such as the FPGA uses many transistors to perform complex multiplication operations, thereby wasting area and increasing power consumption.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a MAC operating device for updating a weight value for a variable.

The present invention has been made in another effort to provide a MAC operating method for updating a weight value for a variable.

An embodiment of the present invention provides a MAC operating device for updating weight values for a plurality of variables. The MAC operating device includes a plurality of operation circuits respectively including an operation capacitor and a plurality of switches; and a division capacitor, wherein a product of the weight value and a variable of the plurality of variables is applied as an input to one of the plurality of operation circuits, and the plurality of operation circuits perform a plurality of operation phases for the updating through a charge sharing of the operation capacitor and the division capacitor by switching the plurality of switches at a determined time.

When performing a first operation phase of the plurality of operation phases, a first operation circuit of the plurality of operation circuits may perform: switching a first operation switch to transfer the input applied to one end of an operation switch of the plurality of switches to the operation capacitor; dividing charges in the operation capacitor stored based on the input to the operation capacitor and the division capacitor according to switching of a second operation switch of the plurality of switches; and confirming a voltage at a node between the operation capacitor and the division capacitor.

The input may be a product of a least significant bit (LSB) of the weight value and a first variable of the plurality of variables.

When performing a last operation phase of the plurality of operation phases, a first operation circuit of the plurality of operation circuits may perform: switching a first operation switch to transfer the input applied to one end of an operation switch of the plurality of switches to the operation capacitor; dividing charges in the operation capacitor stored based on the input to the operation capacitor and the division capacitor according to switching of a second operation switch of the plurality of switches; and confirming a voltage at a node between the operation capacitor and the division capacitor.

The input may be a product of a most significant bit (MSB) of the weight value and a first variable of the plurality of variables.

When the weight value has n bits, the operation phases may be n operation phases.

When there are m operation circuits and capacitance of the operation capacitor is C, capacitance of the division capacitor may be m×C.

Another embodiment of the present invention provides a multiply-and-accumulate (MAC) operating method for updating a weight value on a plurality of variables. The MAC operating method includes:
performing a first operation phase of a plurality of operation phases by applying a product of a least significant bit (LSB) of the weight value and the plurality of variables as an input to a plurality of operation circuits, respectively; performing a second operation phase of the plurality of operation phases by applying a product of a next bit of the LSB of the weight value and the plurality of variables as an input to the plurality of operation circuits, respectively; performing a last operation phase of the plurality of operation phases by applying a product of a most significant bit (MSB) of the weight value and the plurality of variables as an input to the operation circuits, respectively; and determining a result of a MAC operation between the plurality of variables and the weight value by confirming a voltage at a node between an operation capacitor and a division capacitor when the last operation phase ends, wherein the plurality of variables corresponds to the plurality of operation circuits, the operation capacitor is included in the plurality of operation circuits, respectively, and the division capacitor is respectively connected to the plurality of operation circuits.

The performing of the first operation phase may include: switching a first operation switch included in the plurality of operation circuits to transfer the input applied to one end of a first operation switch of the plurality of switches to the operation capacitor; and
dividing charges in the operation capacitor stored based on the input to the operation capacitor and the division capacitor according to switching of a second operation switch of the plurality of switches.

When the weight value has n bits, the operation phases may be n operation phases.

When there are m operation circuits and capacitance of the operation capacitor is C, capacitance of the division capacitor may be m×C.

Another embodiment of the present invention provides a multiply-and-accumulate (MAC) operating method for updating a weight value on a plurality of variables. The MAC operating method includes: performing an operation phase by applying a product of the weight value and a first variable of the plurality of variables as an input to a first operation circuit of a plurality of operation circuits, and performing the operation phase by applying a product of the weight value and a second variable of the plurality of variables as an input to a second operation circuit of a the plurality of operation circuits; and determining a result of a MAC operation between the variables and the weight value by confirming a voltage at a node between an operation capacitor and a division capacitor when the operation phase ends, wherein the plurality of variables corresponds to the plurality of operation circuits, the operation capacitor is included in the plurality of operation circuits, respectively, and the division capacitor is respectively connected to the plurality of operation circuits.

Another embodiment of the present invention provides a multiply-and-accumulate (MAC) operating method for updating a weight value on a plurality of variables. The MAC operating method includes: performing a first operation phase of a plurality of operation phases by applying a product of a least significant bit (LSB) of the weight value and the variables as an input to the plurality of operation circuits, respectively; performing a last operation phase of the plurality of operation phases by applying a product of a most significant bit (MSB) of the weight value and the variables as an input to the plurality of operation circuits, respectively; and determining a result of a MAC operation between the variables and the weight value by confirming a voltage at a node between an operation capacitor and a division capacitor when the last operation phase ends, wherein the plurality of variables corresponds to the plurality of operation circuits, the operation capacitor is included in the plurality of operation circuits, and the division capacitor is respectively connected to the plurality of operation circuits.

DETAILED DESCRIPTION OF THE EMBODIMENTS

Figure 1:
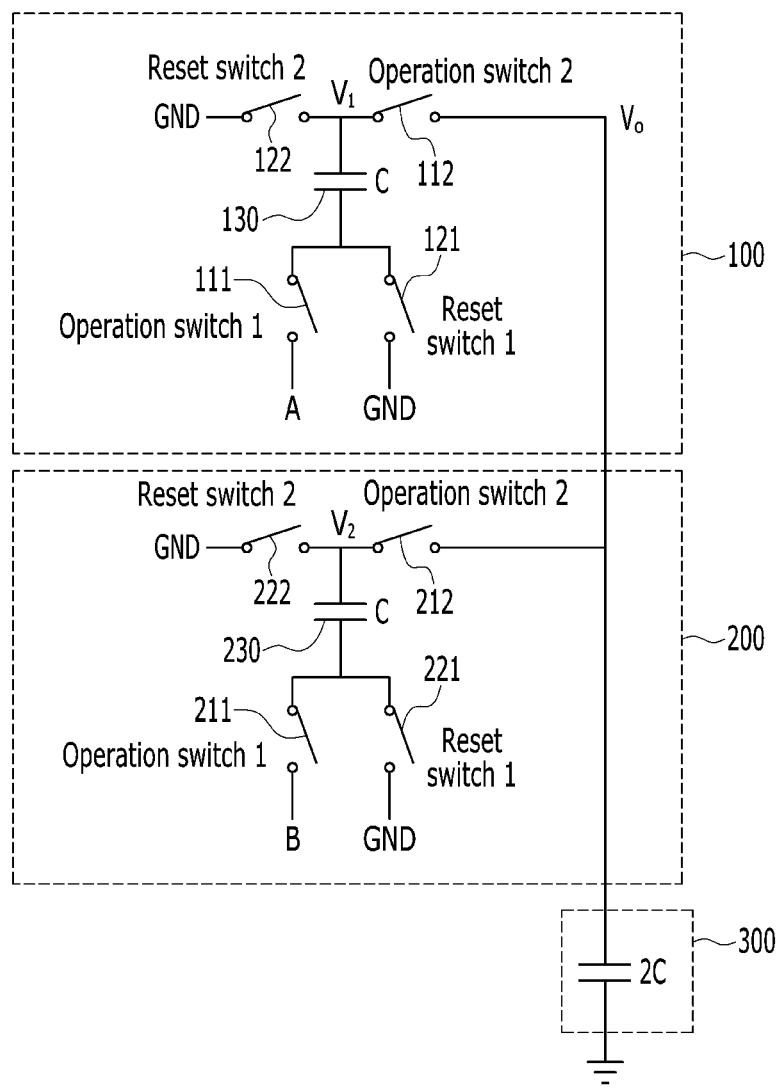
FIG. 1 shows a MAC operation unit according to an embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Unless explicitly described to the contrary, the word "comprise" and variations such as "comprises" or "comprising" will be understood to imply the inclusion of stated elements but not the exclusion of any other elements.

In the present specification, an expression recited in the singular may be construed as singular or plural unless the expression "one", "single", etc. is not in use.

"And/or" includes all combinations of each and at least one of the constituent elements mentioned.

Terms including ordinal numbers such as first, second, and the like will be used only to describe various components, and are not to be interpreted as limiting these components. The terms are only used to differentiate one component from others. For example, while not digressing from the claims according to the present invention, a first constituent element may be called a second constituent element, and similarly, the second constituent element may be called the first constituent element.

In the flowcharts described with reference to the drawings in this specification, the operation order may be changed, various operations may be merged, certain operations may be divided, and certain operations may not be performed.

FIG. 1 shows a MAC operation unit according to an embodiment.

Referring to FIG. 1, the MAC operation unit 10 according to an embodiment may include a first operation circuit 100, a second operation circuit 200, and a division capacitor 300. The first operation circuit 100 and the second operation circuit 200 may include two operation switches, two reset switches, and one operation capacitor, respectively.

One end of the first operation switch 111 included in the first operation circuit 100 may be connected to an input terminal A and the other end of the first operation switch 111 may be connected to an operation capacitor 130. Therefore, when the first operation switch 111 is closed by a first switching clock signal, the operation capacitor 130 may be charged by a voltage at the input terminal A. Further, the other end of the first operation switch 111 may be connected to one end of the first reset switch 121.

One end of a second operation switch 112 included in the first operation circuit 100 may be connected to the operation capacitor 130, and the other end of the second operation switch 112 may be connected to the division capacitor 300. Therefore, when the second operation switch 112 is closed by a second switching clock signal, the charges stored in the operation capacitor 130 may be divided to the division capacitor 300. Further, one end of the second operation switch 112 may be connected to one end of the second reset switch 122.

One end of the operation capacitor 130 included in the first operation circuit 100 may be connected to the first operation switch 111 and the first reset switch 121, and the other end of the operation capacitor 130 may be connected to the second operation switch 112 and the second reset switch 122. Therefore, when the first operation switch 111 is closed, the operation capacitor 130 may be charged by the voltage at the input terminal A, and when the second operation switch 112 is closed, the charges stored in the operation capacitor 130 may be respectively divided according to the capacitances of the operation capacitor 130 and the division capacitor 300. When the first operation switch 111 and the second operation switch 112 are opened and the first reset switch 121 and the second reset switch 122 are closed, the charges stored in the operation capacitor 130 may be discharged to a ground.

One end of a first operation switch 211 included in the second operation circuit 200 may be connected to an input terminal B, and the other end of the first operation switch 211 may be connected to an operation capacitor 230. Therefore, when the first operation switch 211 is closed by the first switching clock signal, the operation capacitor 230 may be charged by the voltage at the input terminal B. Further, the other end of the first operation switch 211 may be connected to one end of the first reset switch 221.

One end of a second operation switch 212 included in the second operation circuit 200 may be connected to the operation capacitor 230, and the other end of the second operation switch 212 may be connected to the division capacitor 300. Therefore, when the second operation switch 212 is closed by the second switching clock signal, the charges stored in the operation capacitor 230 may be divided to the division capacitor 300. Further, one end of the second operation switch 212 may be connected to one end of the second reset switch 222.

One end of the operation capacitor 230 included in the second operation circuit 200 may be connected to the first operation switch 211 and the first reset switch 221, and the other end of the operation capacitor 230 may be connected to the second operation switch 212 and the second reset switch 222. Therefore, when the first operation switch 211 is closed, the operation capacitor 230 may be charged by the voltage at the input terminal B, and when the second operation switch 212 is closed, the charges stored in the operation capacitor 230 may be respectively divided according to the capacitances of the operation capacitor 230 and the division capacitor 300. When the first operation switch 211 and the second operation switch 212 are opened and the first reset switch 221 and the second reset switch 222 are closed, the charges stored in the operation capacitor 230 may all be discharged to the ground.

Regarding the first operation circuit 100 and the second operation circuit 200, one ends of the reset switches 121, 122, 221, and 222 are connected to the ground, so when the reset switches 121, 122, 221, and 222 are closed, the charges stored in the respective operation capacitors 130 and 230 may become 0 (i.e., $V_1=V_2=0$).

One end of the division capacitor 300 may be connected to the first operation circuit 100 and the second operation circuit 200, and the charges stored in the division capacitor 300 may become 0 when the second operation switches 112 and 212 and the second reset switches 122, and 222 are closed.

The MAC operation unit 10 illustrated in FIG. 1 may be used to update an n-bit weight value on two inputs. The MAC operation unit 10 may perform n phases so as to update the n-bit weight value. Each of the n phases may be done in order of "first operation switch ON→second operation switch ON→second operation switch OFF→first operation switch OFF and reset switch ON".

One phase of the n phases in which one cycle of the clock signal is applied may correspond to one bit of the weight value. Therefore, when bit resolution of the weight value increases, the number of clock signal cycles may be increased. For example, one phase (i.e., a clock signal cycle) is needed to process a 1-bit weight value, and n phases are needed to process an n-bit weight value. That is, the MAC operation unit 10 may update the weight value on the input through the operation phases with the same number of times as the bit number of the weight value.

Referring to FIG. 1, when the reset switches 121, 122, 221, and 222 are closed in a phase, the voltages of $V_1$, $V_2$, and $V_o$ are reset to be 0, and the voltage value $V_o$ may be determined as the first operation switches 111 and 211 and the second operation switches 112 and 212 are sequentially switched.

A method for the MAC operation unit 10 to update a 3-bit weight value for two inputs $X_1$ and $X_2$ through three phases will now be described. For each phase, the operation switch and the reset switch in the first operation circuit 100 and the second operation circuit 200 may be switched at a same time according to same switching clock signals.

The MAC operation unit 10 may perform a least significant bit (LSB) operation at Phase 1. The Phase 1 may follow Equation 1.

Phase 1: LSB Calculation

First operation switch ON: $Q=CA_1+CB_1+2C\times 0$

Second operation switch ON: $Q=(C+C+2C)\times V_{oi}$ (Equation 1)

In Equation 1, $A_1$ and $B_1$ may be voltages that are respectively input to the input terminal A and the input terminal B, and may be products of the LSB of the weight values $w_1$ and $w_2$ and the inputs $X_1$ and $X_2$, respectively (i.e., $A_1$=LSB of $w_1\times X_1$, and $B_1$=LSB of $w_2\times X_2$). For example, when the LSB of the weight value $w_1$ is 1, $A_1$ may be equal to $X_1$, and when the LSB of the weight value $w_1$ is 0, $A_1$ may be 0. When the phase 1 ends, $V_{o1}$ may be expressed as in Equation 2.

$$V_{o1} = \frac{A_1 + B_1}{4} \quad \text{(Equation 2)}$$

The MAC operation unit 10 may perform an operation for a next bit of the weight value in Phase 2. The Phase 2 may follow Equation 3.

Phase 2

First operation switch ON: $Q=CA_2+CB_2+2C\times V_{o2}$

Second operation switch ON: $Q=(C+C+2C)\times V_{o2}$ (Equation 3)

In Equation 3, $A_2$ and $B_2$ may be voltages that are respectively input to the input terminal A and the input terminal B, and may be products of the next bit of the weight values $w_1$ and $w_2$ and the inputs $X_1$ and $X_2$, respectively. For example, when the next bit of the weight value $w_1$ is 1, $A_2$ may be equal to $X_1$, and when the next bit of the weight value $w_1$ is 0, $A_2$ may be equal to 0. When the phase 2 ends, $V_{o2}$ may be expressed as in Equation 4.

$$V_{o2} = \frac{A_2 + B_2}{4} + \frac{A_1 + B_1}{8} \quad \text{(Equation 4)}$$

The MAC operation unit 10 may perform an operation for a most significant bit (MSB) of the weight value at Phase 3. The Phase 3 may follow Equation 5.

Phase 3: MSB Calculation

First operation switch ON: $Q=CA_2+CB_2+2C\times V_{o2}$

Second operation switch ON: $Q=(C+C+2C)\times V_{o2}$ (Equation 5)

In Equation 3, $A_3$ and $B_3$ may be voltages that are input to the input terminal A and the input terminal B, respectively, and may be products of the MSB of the weight values $w_1$ and $w_2$ and the inputs $X_1$ and $X_2$, respectively. For example, when the MSB of the weight value $W_1$ is 1, $A_3$ may be equal to $X_1$, and when the MSB of the weight value $W_1$ is 0, $A_3$ may be equal to 0. After the phase 3 ends, $V_{o3}$ may be expressed as in Equation 6.

$$V_{o3} = \frac{A_3 + B_3}{4} + \frac{A_2 + B_2}{8} + \frac{A_1 + B_1}{16} \quad \text{(Equation 6)}$$
$$= \frac{4(A_3 + B_3) + 2(A_2 + B_2) + (A_1 + B_1)}{16}$$

Figure 2:
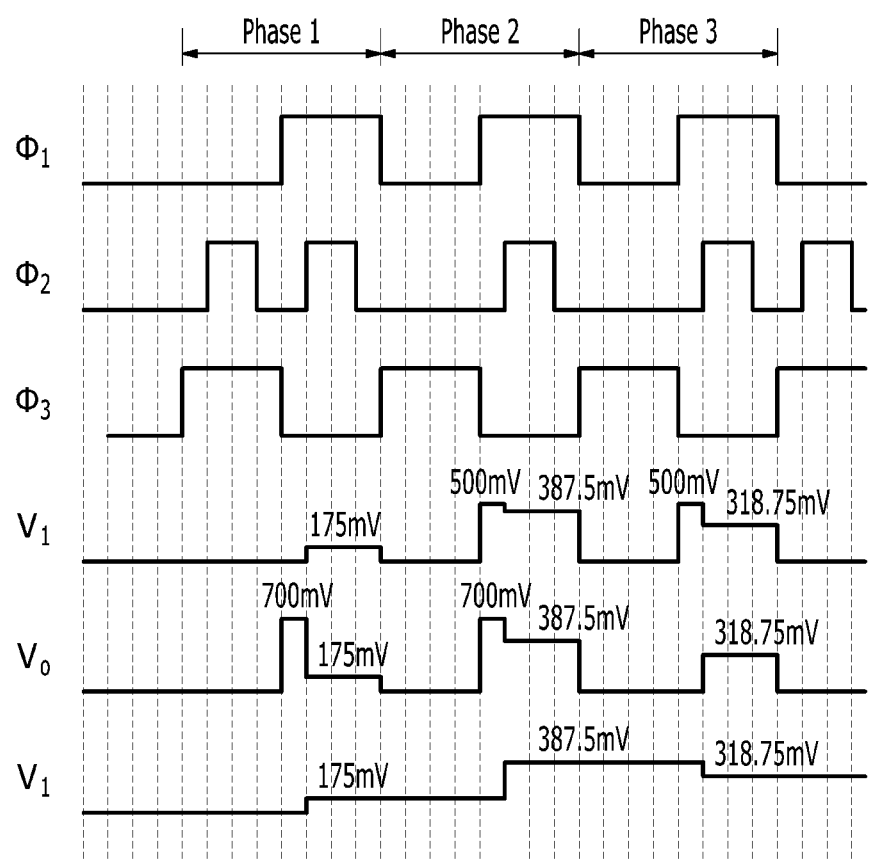
FIG. 2 is a schematic diagram illustrating switching clock signals for the MAC operation unit and voltages at respective nodes.

FIG. 2 is a schematic diagram illustrating switching clock signals for the MAC operation unit and voltages at respective nodes.

Referring to FIG. 1 and FIG. 2, when the reset switch ($\phi_3$) is turned to on-off at the Phase 1, voltages at respective ends of the operation capacitors 130 and 230 may be reset to 0. In this instance, the second operation switch ($\phi_2$) may be turned to on-off so as to make the amount of charges stored in the division capacitor 300 be 0.

Thereafter, the voltages of the input terminals may charge the operation capacitors according to a switching of the first operation switch ($\phi_1$). When the first operation switch 111 of the first operation circuit 100 is switched, the voltage of $V_1$ may become equal to the voltage at the input terminal A by capacitive coupling. When the first operation switch 211 of the second operation circuit 200 is concurrently switched, the voltage of $V_2$ may become equal to the voltage at the input terminal B by capacitive coupling. Referring to FIG. 2, the inputs $X_1$ and $X_2$ and the weight values $w_1$ and $w_2$ follow Equation 7.

Input $X_1$: 500 mV Input $X_2$: 700 mV

Weight $w_1$: $110_{(2)}$ Weight $w_2$: $011_{(2)}$ (Equation 7)

In Equation 7, the binary number of 110 is equal to the decimal number 6, and the binary number of 011 is equal to the decimal number 3, so the weight value $w_1$ is equal to 6, and the weight value $w_2$ is equal to 3. That is, the MAC operation unit shown in FIG. 2 and expressed in Equation 7 may update the input 500 [mV] with the weight value of 6, and may update the input 700 [mV] with the weight value 3.

Referring to Equation 7, the LSB of the weight value $w_1$ is 0, so the voltage at the input terminal A and the voltage of $V_1$ are 0 [V], and the LSB of the weight value $w_2$ is 1, so the voltage at the input terminal B and the voltage of $V_2$ are 700 [mV].

When the second operation switches 112 and 212 are closed while the first operation switches 111 and 211 are closed at the Phase 1, the charges at nodes $V_1$, $V_2$, and $V_o$ are shared, and hence, $V_1$, $V_2$, and $V_o$ may all become $V_{o1}$. The $V_{o1}$ is expressed in Equation 8.

$$V_{o1} = \frac{0 + 700 \text{ mV}}{4} = 175 \text{ mV} \quad \text{(Equation 8)}$$

When the switching of the second operation switches 112 and 212 and the second reset switches 122 and 222 are overlapped, the charges stored in $V_o$ are discharged to the ground connected to the second reset switches 122 and 222, so the switching of the second operation switches 112 and 212 and the second reset switches 122 and 222 may not be overlapped (a non-overlap method) while the first operation switches 111 and 211 are closed as shown in FIG. 2.

When the reset switch is switched at the Phase 2, the voltages at the respective ends of the operation capacitors 130 and 230 may be reset to be 0 ($V_1=V_2=0$). When the first operation switch 111 of the first operation circuit 100 is switched, the voltage of $V_1$ may become equal to a product of the second least bit of the weight value $w_1$ and the input $X_1$ by a capacitive coupling, and when the first operation switch 211 of the second operation circuit 200 is switched, the voltage of $V_2$ may become equal to a product of the second least bit of the weight value $w_2$ and the input $X_2$ by capacitive coupling. In Equation 7, the second least bits of the weight values $w_1$ and $w_2$ are 1, so the inputs $X_1$ and $X_2$ may be transferred to $V_1$ and $V_2$.

When the second operation switches 112 and 212 are closed while the first operation switches 111 and 211 are closed in the Phase 2, the charges at the nodes of $V_1$, $V_2$, and $V_o$ are shared, and hence, $V_1$, $V_2$, and $V_o$ may become $V_{o2}$. $V_{o2}$ is expressed in Equation 9.

$$V_{o2} = \frac{500 \text{ mV} + 700 \text{ mV}}{4} + \frac{0 + 700 \text{ mV}}{8} = 387.5 \text{ mV} \quad \text{(Equation 9)}$$

When the reset switch is switched at the Phase 3, the voltages at the respective ends of the operation capacitors 130 and 230 may be reset to 0 ($V_1=V_2=0$). When the first operation switch 111 of the first operation circuit 100 is switched, the voltage of $V_1$ may be equal to a product of the MSB of the weight value $w_1$ and the input $X_1$ by capacitive coupling, and when the first operation switch 211 of the second operation circuit 200 is switched, the voltage of $V_2$ may be equal to the product of the MSB of the weight value $w_2$ and the input $X_2$ by capacitive coupling. In Equation 7, the MSB of the weight value $w_1$ is 1 and the MSB of the weight value $w_2$ is 0, so the input $X_1$ is transferred to $V_1$, and $V_2$ is 0 [V].

When the second operation switches 112 and 212 are closed while the first operation switches 111 and 211 are closed at the Phase 3, the charges of the nodes $V_1$, $V_2$, and $V_o$ are shared, and hence, $V_1$, $V_2$, and $V_o$ may all become $V_{o3}$. The voltage $V_{o3}$ at the node between the operation capacitors 130 and 230 and the division capacitor 300 is expressed in Equation 10.

$$V_{o3} = \frac{500 \text{ mV} + 0}{4} + \frac{500 \text{ mV} + 700 \text{ mV}}{8} + \quad \text{(Equation 10)}$$
$$\frac{0 + 700 \text{ mV}}{16}$$
$$= \frac{4(500 \text{ mV} + 0) + 2(500 \text{ mV} + 700 \text{ mV}) + (0 + 700 \text{ mV})}{16}$$
$$= \frac{500 \text{ mV} \times 6 + 700 \text{ mV} \times 3}{16}$$
$$= 318.75 \text{ mV}$$

The weight value of 6 may be updated to the input of 500 [mV] through 500 [mV]×6 shown in the numerator of Equation 10, and the weight value 3 may be updated to the input of 700 [mV] through 700 [mV]×3. That is, the MAC operation unit may determine a result of a MAC operation between the 3-bit weight value and the input by confirming the voltage at the node between the operation capacitors 130 and 230 and the division capacitor 300 after three operation phases.

$V_{o3}$ may be reset to 0 by concurrent switching of the second operation switch and the second reset switch.

Figure 3:
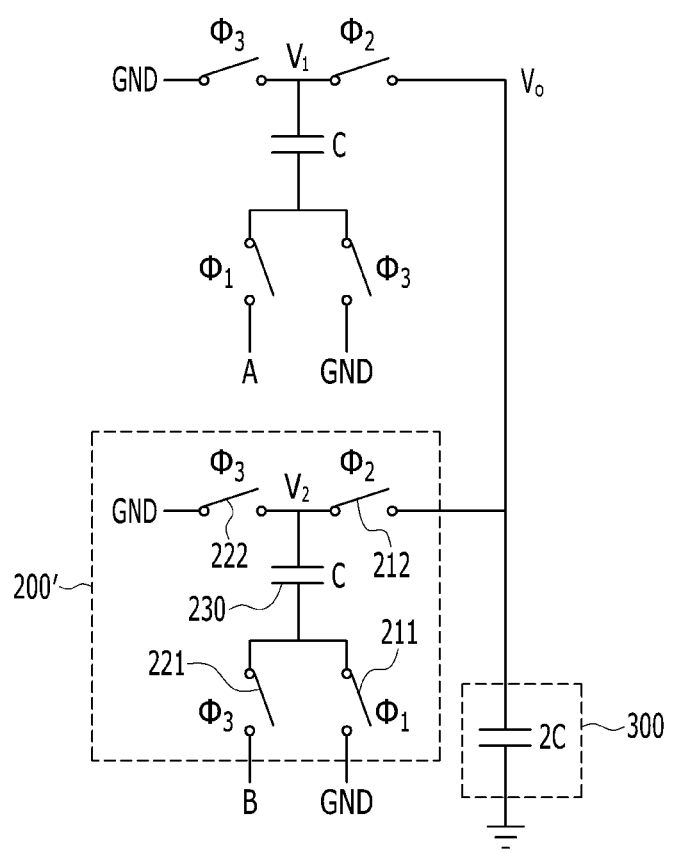
FIG. 3 shows a schematic view of a MAC operation unit according to another embodiment.
Figure 4:
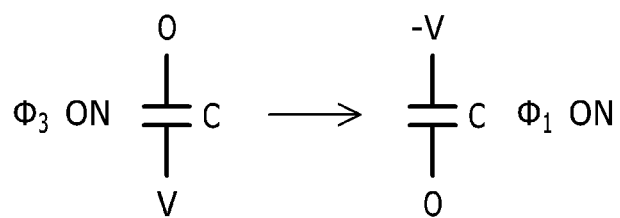
FIG. 4 is a schematic diagram illustrating operations of a first operation switch and a first reset switch in a second operation circuit according to another embodiment.

FIG. 3 shows a schematic view of a MAC operation unit according to another embodiment, and FIG. 4 is a schematic diagram illustrating operations of a first operation switch and a first reset switch in a second operation circuit according to another embodiment.

An operation circuit of the MAC operation unit according to another embodiment may realize a negative operation by changing switching timing of the first operation switch and the first reset switch. For example, referring to FIG. 3, the first operation switch is operated by a clock signal timing of the first reset switch, and the first reset switch is operated by the clock signal timing of the first operation switch, thereby realizing the negative operation. In detail, when the first operation switch and the first reset switch of the second operation circuit are exchanged, the operation of the Phase 1 to the Phase 3 may be performed as expressed in Equation 11 to Equation 13.

Phase 1: *LSB* Calculation (Equation 11)

First operation switch ON:

$Q = CA_0 + C(-B_0) + 2C \times 0$

Second operation switch ON:

$Q = (C + C + 2C) \times V_{o0}$ $V_{o0} = \dfrac{A_0 - B_0}{4}$

Phase 2 (Equation 12)

First operation switch ON:

$Q = CA_1 + C(-B_1) + 2C \times V_{o0}$

Second operation switch ON:

$Q = (C + C + 2C) \times V_{o1}$ $V_{o1} = \dfrac{A_1 - B_1}{4} + \dfrac{A_0 - B_0}{8}$ Phase 3: *MSB* Calculation (Equation 13)

First operation switch ON:

$Q = CA_2 + C(-B_2) + 2C \times V_{o1}$

Second operation switch ON:

$Q - (C + C + 2C) \times V_{o2}$ $V_{o2} = \dfrac{A_2 - R_2}{4} + \dfrac{A_1 - R_1}{8} + \dfrac{A_0 - R_0}{16}$
$= \dfrac{4(A_2 - B_2) + 2(A_1 - B_1) + (A_0 - B_1)}{16}$ Referring to FIG. 3 and FIG. 4, when the first reset switch 221 of the second operation circuit 200' is switched, respective ends of an operation capacitor 230 of a second operation circuit 200' may become 0 and the voltage V of the input B. When the first operation switch 211 is switched, the potential 0 of the ground is applied to one end of the operation capacitor 230, and hence, the voltage at the other end (i.e., the node $V_2$) of the operation capacitor 230 may be −V. The charges of the nodes $V_1$, $V_2$, and $V_o$ are shared by switching of the second operation switch 212, and the negative operation may be performed.

Figure 5:
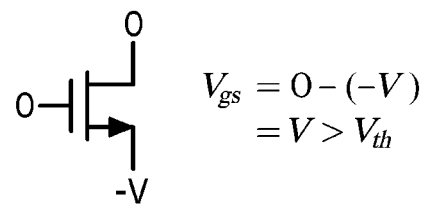
FIG. 5 is a schematic diagram illustrating an operation of a switch according to another embodiment.

Here, when the voltage at the node $V_2$ is a negative voltage, operations of another switches (the second operation switch and the second reset switch) may have a problem. Referring to FIG. 5, when 0 [V] is applied to the gate so as to turn the second operation switch and the second reset switch to OFF, a gate-source voltage $V_{gs}$ of the switch becomes V (V>$V_{th}$), so the second operation switch and the second reset switch may be turned on. For this purpose, −1 [V] is applied to the switch to designate the OFF operation of the switch, and 1 [V] is applied to designate the ON operation of the switch, so an erroneous operation of the switch may be intercepted.

Figure 6:
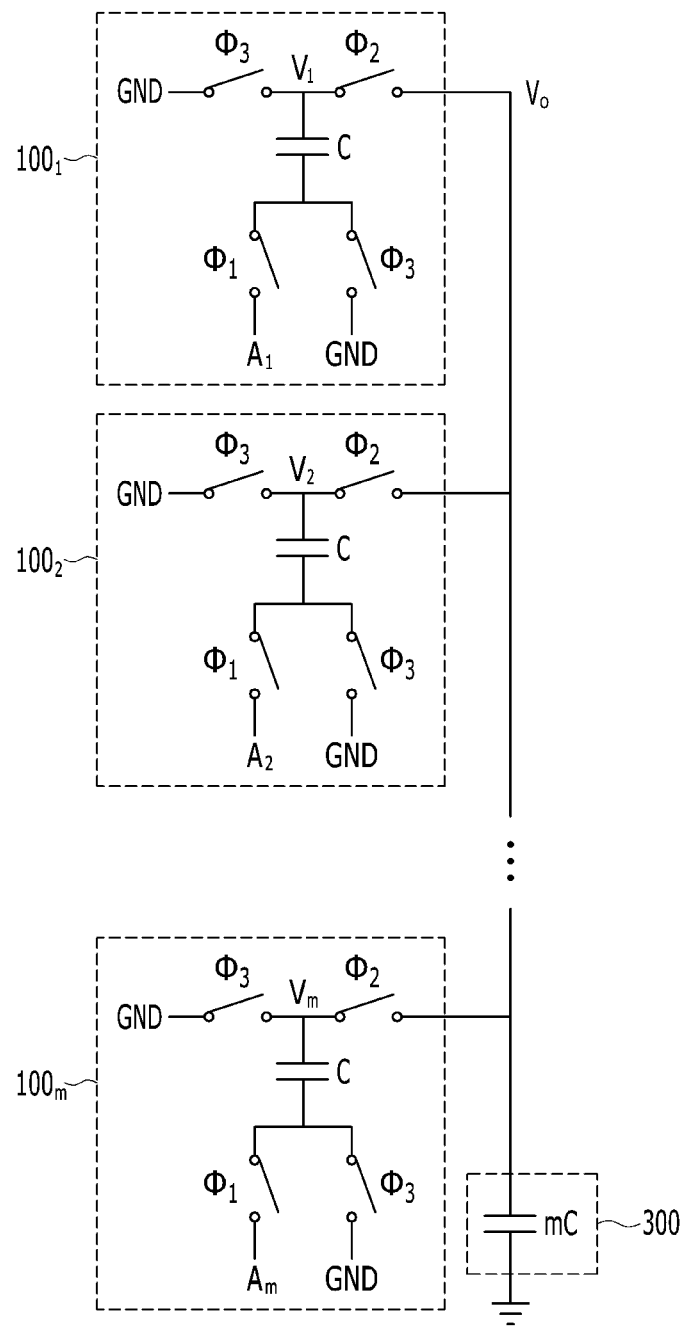
FIG. 6 shows a MAC operation unit according to yet another embodiment.

FIG. 6 shows a MAC operation unit according to yet another embodiment.

The MAC operation unit according to yet another embodiment may include m-numbered operation circuits for updating m-numbered variables or parameters, and when the capacitance of the operation capacitor included in the respective operation circuits is C, capacitance of the division capacitor may be m×C.

For example, the m operation circuits included in the MAC operation unit according to yet another embodiment respectively perform n-numbered phases, thereby updating an n-bit weight value to the m variables or parameters.

Equations 14 to 16 express a method for the MAC operation unit including four operation circuits to perform a MAC operation on four inputs and an N-bit weight value.

Phase 1: LSB Calculation

First operation switch ON:

$Q = CV_{in,0}W_{0,LSB} + CV_{in,1}W_{1,LSB} + CV_{in,2}W_{2,LSB} + CV_{in,3}W_{3,LSB} + 4C \times 0$ (Equation 14)

Second operation switch ON:

$Q = (C + C + C + C + 4C) \times V_{out,0}$ $V_{out,0} = \dfrac{V_{in,0}W_{0,LSB} + V_{in,1}W_{1,LSB} + V_{in,2}W_{2,LSB} + V_{in,3}W_{3,LSB}}{8}$ Equation 14 expresses a first phase (LSB operation) of the MAC operation unit including four operation circuits. In Equation 14, $V_{in,0}$, $V_{in,1}$, $V_{in,2}$, and $V_{in,3}$ are respectively four inputs provided to four operation circuits. The capacitance of the operation capacitor included in the respective four operation circuits is C, so capacitance of the division capacitor may be 4C.

Equation 15 expresses a second phase (an operation for a next bit of the LSB) of the MAC operation unit including four operation circuits, and Equation 16 expresses a last phase (MSB operation) of the MAC operation unit including four operation circuits.

Phase 2: LSB+1 Calculation

First operation switch ON:

$Q = CV_{in,0}W_{0,LSB+1} + CV_{in,1}W_{1,LSB+1} + CV_{in,2}W_{2,LSB+1} + CV_{in,3}W_{3,LSB+1} + 4C \times V_{out,0}$ (Equation 15)

Second operation switch ON:

$$Q = (C + C + C + C + 4C) \times V_{out,1} \quad \text{(Equation 16)}$$

$$V_{out,1} = \frac{V_{in,0}W_{0,LSB+1} + V_{in,1}W_{1,LSB+1} + V_{in,2}W_{2,LSB+1} + V_{in,3}W_{3,LSB+1}}{8} + \frac{1}{2}V_{out,0}$$

$$= \frac{V_{in,0}W_{0,LSB+1} | V_{in,1}W_{1,LSB+1} | V_{in,2}W_{2,LSB+1} | V_{in,3}W_{3,LSB+1}}{8} +$$

$$\frac{V_{in,0}W_{0,LSB} + V_{in,1}W_{1,LSB} + V_{in,2}W_{2,LSB} + V_{in,3}W_{3,LSB}}{16}$$

Phase N: MSB Calculation

First operation switch ON:

$$Q = CV_{in,0}W_{0,MSB} + CV_{in,1}W_{1,MSB} + CV_{in,2}W_{2,MSB} + CV_{in,3}W_{3,MSB} + 4C \times V_{out,N-1}$$

Second operation switch ON:

$$Q = (C + C + C + C + 4C) \times V_{out,N}$$

$$V_{out,N} = \frac{V_{in,0}W_{0,MSB} + V_{in,1}W_{1,MSB} + V_{in,2}W_{2,MSB} + V_{in,3}W_{3,MSB}}{8} + \frac{1}{2}V_{out,N-1}$$

$$= \frac{V_{in,0}W_{0,MSB} + V_{in,1}W_{1,MSB} + V_{in,2}W_{2,MSB} + V_{in,3}W_{3,MSB}}{8} +$$

$$\frac{V_{in,0}W_{0,MSB-1} + V_{in,1}W_{1,MSB-1} + V_{in,2}W_{2,MSB-1} + V_{in,3}W_{3,MSB}}{16} + \ldots +$$

$$\frac{V_{in,0}W_{0,LSB} + V_{in,1}W_{1,LSB} + V_{in,2}W_{2,LSB} + V_{in,3}W_{3,LSB}}{8 \times 2^{N-1}}$$

$$= \frac{V_{in,0}\left(\begin{array}{c}2^{N-1} \times W_{0,MSB} + 2^{N-2} \times W_{0,MSB-1} + \ldots + \\ 2 \times W_{0,LSB+1} + W_{0,LSB}\end{array}\right) + \ldots +}{8 \times 2^{N-2}}$$

$$\frac{V_{in,3}\left(\begin{array}{c}2^{N-1} \times W_{3,MSB} + 2^{N-2} \times W_{3,MSB-1} + \ldots + \\ 2 \times W_{3,LSB+1} + W_{3,LSB}\end{array}\right)}{8 \times 2^{N-2}}$$

$$= \frac{V_{in,0}W_0 + V_{in,1}W_1 + V_{in,2}W_2 + V_{in,3}W_3}{8 \times 2^{N-1}}$$

$$= \frac{\sum V_{in,i}W_i}{8 \times 2^{N-1}}$$

Equation 17 expresses, when the MAC operation unit including m operation circuits (i=1, 2, ..., m) performs an operation on an N-bit (j=1, 2, ..., N) weight value, an output $V_{out,N}$ after performing the N-th operation phase.

$$V_{out,N} = \frac{\sum V_{in,i}W_j}{N \times 2^N} \quad \text{(Equation 17)}$$

As described above, the MAC operation unit requiring many parameters and operations for increasing the accuracy in the deep learning algorithm is realized with hardware including switches and capacitors, thereby reducing the degree of hardware integration, and reducing the hardware area (complexity).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A multiply-and-accumulate (MAC) operating device for updating a weight value on a plurality of variables, the MAC operating device comprising:
   a plurality of operation circuits respectively including an operation capacitor and a plurality of switches; and
   a division capacitor,
   wherein a product of the weight value and a variable of the plurality of variables is applied as an input to one of the plurality of operation circuits, and the plurality of operation circuits perform a plurality of operation phases for the updating through a charge sharing of the operation capacitor and the division capacitor by switching the plurality of switches at a determined time.

2. The MAC operating device of claim 1, wherein
   when performing a first operation phase of the plurality of operation phases, a first operation circuit of the plurality of operation circuits performs:
   switching a first operation switch to transfer the input applied to one end of an operation switch of the plurality of switches to the operation capacitor;
   dividing charges in the operation capacitor stored based on the input to the operation capacitor and the division capacitor according to switching of a second operation switch of the plurality of switches; and
   confirming a voltage at a node between the operation capacitor and the division capacitor.

3. The MAC operating device of claim 2, wherein
   the input is a product of a least significant bit (LSB) of the weight value and a first variable of the plurality of variables.

4. The MAC operating device of claim 1, wherein
   when performing a last operation phase of the plurality of operation phases, a first operation circuit of the plurality of operation circuits performs:
   switching a first operation switch to transfer the input applied to one end of an operation switch of the plurality of switches to the operation capacitor;
   dividing charges in the operation capacitor stored based on the input to the operation capacitor and the division capacitor according to switching of a second operation switch of the plurality of switches; and
   confirming a voltage at a node between the operation capacitor and the division capacitor.

5. The MAC operating device of claim 4, wherein
   the input is a product of a most significant bit (MSB) of the weight value and a first variable of the plurality of variables.

6. The MAC operating device of claim 1, wherein
   when the weight value has n bits, the operation phases are n operation phases.

7. The MAC operating device of claim 1, wherein
   when there are m operation circuits and capacitance of the operation capacitor is C, capacitance of the division capacitor is m×C.

8. A multiply-and-accumulate (MAC) operating method for updating a weight value on a plurality of variables, the MAC operating method comprising:
   performing a first operation phase of a plurality of operation phases by applying a product of a least significant bit (LSB) of the weight value and the plurality of variables as an input to a plurality of operation circuits, respectively;

performing a second operation phase of the plurality of operation phases by applying a product of a next bit of the LSB of the weight value and the plurality of variables as an input to the plurality of operation circuits, respectively;

performing a last operation phase of the plurality of operation phases by applying a product of a most significant bit (MSB) of the weight value and the plurality of variables as an input to the operation circuits, respectively; and determining a result of a MAC operation between the plurality of variables and the weight value by confirming a voltage at a node between an operation capacitor and a division capacitor when the last operation phase ends, wherein the plurality of variables corresponds to the plurality of operation circuits, the operation capacitor is included in the plurality of operation circuits, respectively, and the division capacitor is respectively connected to the plurality of operation circuits.

9. The MAC operating method of claim 8, wherein the performing of the first operation phase includes:

switching a first operation switch included in the plurality of operation circuits to transfer the input applied to one end of a first operation switch of the plurality of switches to the operation capacitor; and dividing charges in the operation capacitor stored based on the input to the operation capacitor and the division capacitor according to switching of a second operation switch of the plurality of switches.

10. The MAC operating method of claim 8, wherein when the weight value has n bits, the operation phases are n operation phases.

11. The MAC operating method of claim 8, wherein when there are m operation circuits and capacitance of the operation capacitor is C, capacitance of the division capacitor is m×C.

12. A multiply-and-accumulate (MAC) operating method for updating a weight value to a plurality of variables, the MAC operating method comprising:

performing an operation phase by applying a product of the weight value and a first variable of the plurality of variables as an input to a first operation circuit of a plurality of operation circuits, and performing the operation phase by applying a product of the weight value and a second variable of the plurality of variables as an input to a second operation circuit of a the plurality of operation circuits; and determining a result of a MAC operation between the variables and the weight value by confirming a voltage at a node between an operation capacitor and a division capacitor when the operation phase ends, wherein the plurality of variables corresponds to the plurality of operation circuits, the operation capacitor is included in the plurality of operation circuits, respectively, and the division capacitor is respectively connected to the plurality of operation circuits.

13. A multiply-and-accumulate (MAC) operating method for updating a weight value on a plurality of variables, the MAC operating method comprising:

performing a first operation phase of a plurality of operation phases by applying a product of a least significant bit (LSB) of the weight value and the variables as an input to the plurality of operation circuits, respectively;

performing a last operation phase of the plurality of operation phases by applying a product of a most significant bit (MSB) of the weight value and the variables as an input to the plurality of operation circuits, respectively; and determining a result of a MAC operation between the variables and the weight value by confirming a voltage at a node between an operation capacitor and a division capacitor when the last operation phase ends, wherein the plurality of variables corresponds to the plurality of operation circuits, the operation capacitor is included in the plurality of operation circuits, and the division capacitor is respectively connected to the plurality of operation circuits.

* * * * *